(12) United States Patent
Nakamura

(10) Patent No.: US 6,242,727 B1
(45) Date of Patent: *Jun. 5, 2001

(54) DISTANCE DETECTOR HAVING PAIRS OF SENSORS ARRANGED AS A MIRROR IMAGE WITH RESPECT TO A VIRTUAL LINE

(75) Inventor: Kenji Nakamura, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,630

(22) Filed: Nov. 4, 1998

(30) Foreign Application Priority Data

Nov. 19, 1997 (JP) ...................... 9-318020

(51) Int. Cl.[7] ...................................... G02B 27/40
(52) U.S. Cl. .................. 250/201.2; 250/559.38; 250/208.1; 396/111
(58) Field of Search ............................. 250/201.2, 201.6, 250/208.1, 208.2, 208.6, 559.38; 396/99, 106, 111, 120, 121, 123, 125; 356/3.01, 3.02, 3.06, 3.08, 3.13, 3.14, 4.01, 4.04

(56) References Cited

U.S. PATENT DOCUMENTS

| | | | |
|---|---|---|---|
| 4,368,978 | * 1/1983 | Tsunekawa et al. | 356/3.13 |
| 4,571,047 | * 2/1986 | Hirai | 396/93 |
| 4,910,548 | 3/1990 | Taniguchi et al. | 396/123 |
| 5,539,493 | * 7/1996 | Kusaka | 396/111 |

* cited by examiner

Primary Examiner—Que T. Le
Assistant Examiner—Thanh X. Luu
(74) Attorney, Agent, or Firm—Burns, Doane, Swecker & Mathis, LLP

(57) ABSTRACT

A distance detector has an optical system for forming a subject image, a distance measurement sensor, and a distance calculating circuit for calculating a distance to a subject based on an output from the distance measurement sensor. The distance measurement sensor has a plurality of line sensors disposed substantially on an imaging plane of the optical system. Each of the plurality of line sensors has a light sensing array composed of a plurality of pixels for sensing the subject image and a processor array for processing outputs of the light sensing array. The plurality of line sensors are arranged so as to be axisymmetrical with respect to a virtual line, with the light sensing arrays arranged closer to the virtual line than the processor arrays.

14 Claims, 9 Drawing Sheets

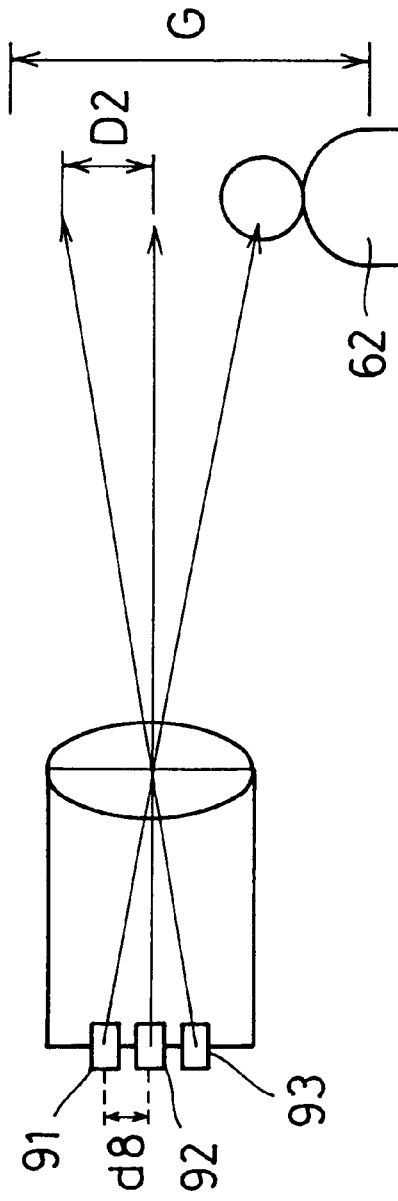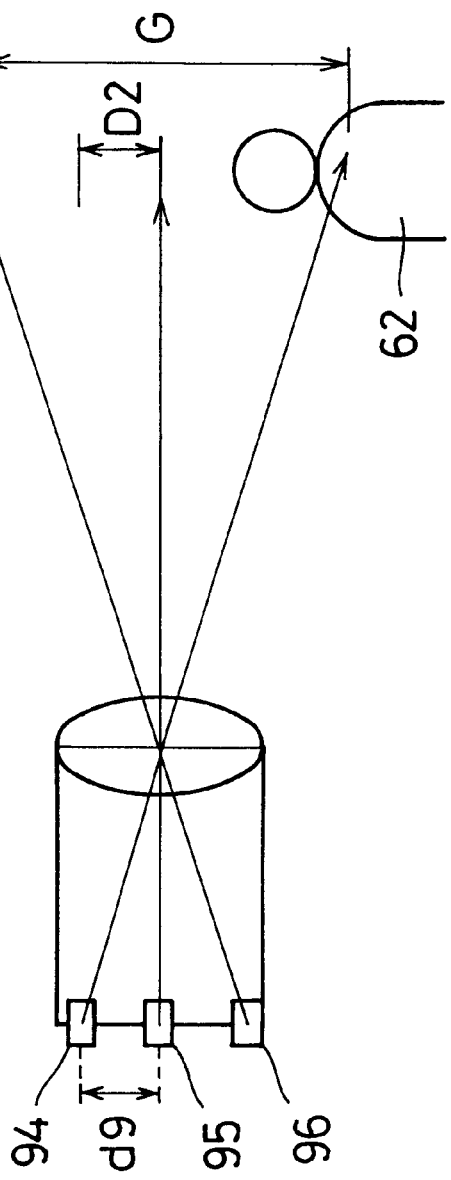

DISTANCE DETECTOR HAVING PAIRS OF SENSORS ARRANGED AS A MIRROR IMAGE WITH RESPECT TO A VIRTUAL LINE

This application is based on application Ser. No. H09-318020 filed in Japan, the content of which is hereby incorporated by reference.

BACKGROUND OF THE INVENTION

1. Field of the Invention

The present invention relates to a distance detector used for automatic focusing in silver halide film cameras, video cameras and still video cameras (SVC).

2. Description of the Prior Art

Conventional examples of such a distance detector include one that performs distance measurement in one line of distance measurement area 61 horizontal to a taking image plane 60 of a camera as shown in FIG. 1. The distance measurement sensor provided in the conventional distance detector is configured, for example, as shown in FIG. 2. A pair of line sensors 75 and 76 are disposed on the left and the right with a control circuit 10 in between. The line sensors 75 and 76 are situated substantially on the imaging planes of a pair of lenses disposed with a predetermined distance between the optical axes thereof. The line sensors 75 and 76 sense subject image light by means of light sensing arrays 12 comprising a plurality of light sensing elements.

Photocharges generated in the light sensing arrays 12 are successively transferred and output for each pixel by processors 11 in response to a clock supplied from the control circuit 10. Based on the output from the distance measurement sensor, a microcomputer calculates the distance to the subject.

In a distance measurement sensor shown in FIG. 3, a pair of line sensors 77 and 78 are disposed on the left and the right so as to have the same function as that of the above-described distance measurement sensor (FIG. 2). Processors 31 are disposed for each pixel on both sides with the light sensing arrays 12 in between.

However, in the above-described conventional distance detectors, since the distance measurement area 61 merely crosses the central portion of the taking image plane 60 as shown in FIG. 1, distance measurement cannot be performed when the subject 62 is situated in the lower part or in the upper part of the image plane 60.

In order to ensure the measurement of the distance to the subject 62, a configuration as shown in FIG. 4 is considered in which a plurality of lines of distance measurement areas 63 to 65 are provided so that distance measurement can be performed in a wider range. In this configuration, the shorter the distance D1 between the distance measurement areas 63 to 65 which the line sensors face is, the more distance measurement areas can be provided in the taking image plane 60 and the more the detection of the subject 62 is ensured. Since the subject 62 can be detected by use of a multiplicity of line sensors, the distance detection accuracy can be improved.

Distance detectors having such a plurality of lines of distance measurement areas include one having a distance measurement sensor configured as shown in FIG. 5. The distance measurement sensor shown in FIG. 5 has two pairs of lines sensors 81 to 84 and performs distance measurement along two lines.

The distance measurement sensor has the control circuit 10 at a position with respect to which the sensor is symmetrical. The two pairs of line sensors 81 to 84 are arranged so that the light sensing arrays 12 and the processors 11 accompanying them are oriented in the same direction. In the line sensors 81 to 84, reduction in the distance d7 between the light sensing arrays 12 of the line sensors is physically limited because of the existence of the processors 11.

When the focal length of the taking system is long in order to obtain a large subject image, as schematically shown in FIGS. 6A and 6B, the angle of view G of the taking optical system is generally narrow. In this case, when the distance d8 between lines sensors 91 to 93 is sufficiently short as shown in FIG. 6A, distance measurement can be performed with a distance measurement distance D2 on the taking image plane. However, when the distance d9 between line sensors 94 to 96 is long as shown in FIG. 6B, the distance measurement line density decreases because distance measurement with the distance measurement distance D2 is impossible, so that the distance measurement areas are outside the taking image plane in some cases. As a result, the reliability and the accuracy of the distance to the subject 62 deteriorate.

SUMMARY OF THE INVENTION

An object of the present invention is to provide a distance detector having a plurality of pairs of line sensors wherein the distance between the distance measurement lines is reduced in order to enable reliable measurement of the distance to the subject and to improve the distance measurement accuracy.

To achieve the above-mentioned object, according to the present invention, a distance detector is provided with: an optical system for forming a subject image; a distance measurement sensor having a plurality of line sensors disposed substantially on an imaging plane of the optical system, the plurality of line sensors each having an array of light sensing elements comprising a plurality of pixels for sensing the subject image and an array of processors for processing outputs of the light sensing elements, the plurality of line sensors being arranged so as to be axisymmetrical with respect to a virtual line and so that the arrays of light sensing elements are closer to the virtual line than the arrays of processors; and a distance calculating circuit for calculating a distance to a subject based on an output from the distance measurement sensor.

BRIEF DESCRIPTION OF THE DRAWINGS

This and other objects and features of this invention will become clear from the following description, taken in conjunction with the preferred embodiments with reference to the accompanied drawings in which:

FIGS. 6A and 6B are schematic views showing the relationship between the line sensors and the distance measurement positions of the distance measurement sensor;

DESCRIPTION OF THE PREFERRED EMBODIMENTS

<First Embodiment>

Figure 7:
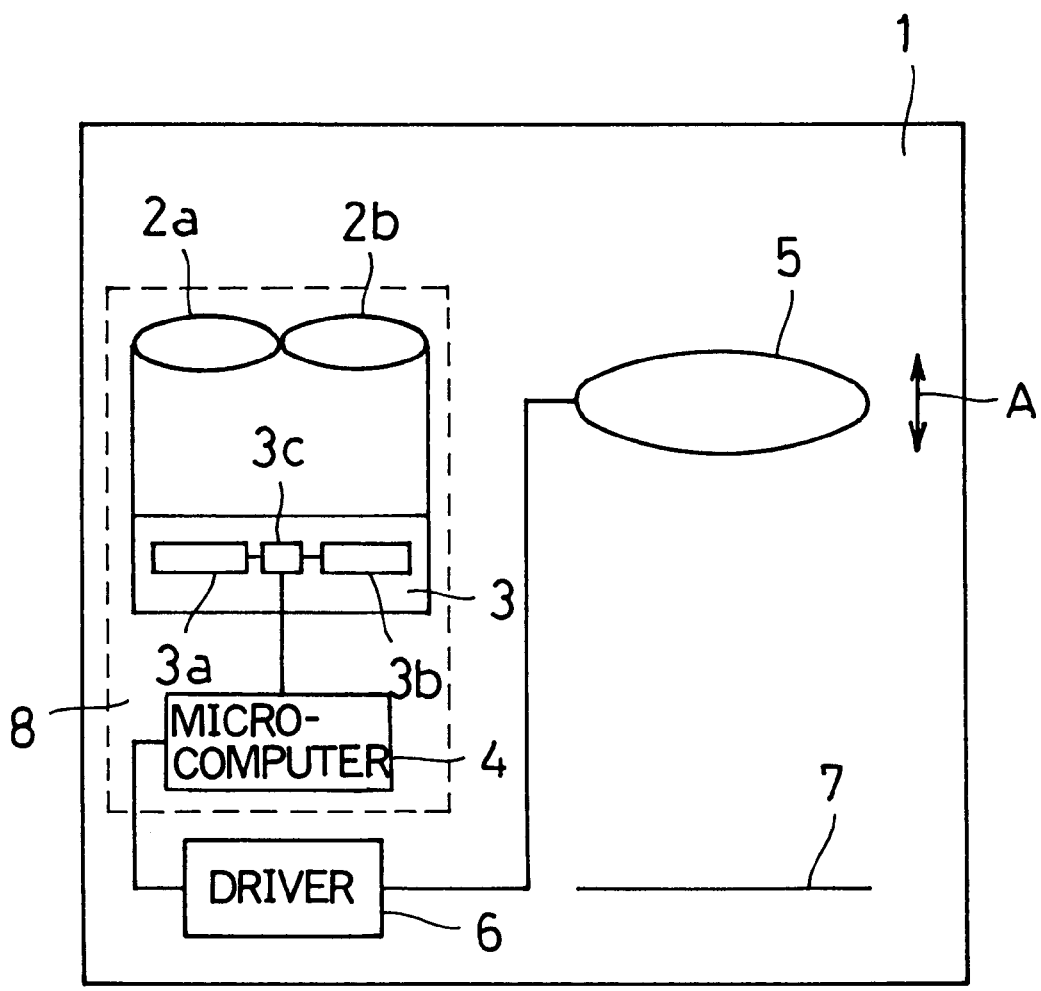
FIG. 7 is a block diagram of an imaging apparatus according to a first embodiment of the present invention.

Hereinafter, embodiments of the present invention will be described. FIG. 7 is a block diagram of an imaging apparatus 1 such as a silver halide film camera provided with a distance detector according to this embodiment. The imaging apparatus 1 images the subject on imaging means 7 such as silver halide film through an imaging optical system 5. The distance detector 8 detects the distance to the subject. A microcomputer 4 incorporated in the distance detector 8 performs automatic focusing by moving the imaging optical system 5 as shown by the arrow A by use of driver 6 comprising a motor based on the detected distance to the subject.

The distance detector 8 has a pair of distance measurement optical systems 2a and 2b disposed in parallel, a distance measurement sensor 3 having a plurality of pairs of line sensors disposed substantially on the imaging plane of the optical systems 2a and 2b, and the microcomputer 4 which is means for performing calculation to obtain the distance to the subject based on signals from the distance measurement sensor 3. Although only a control circuit 3c and a pair of line sensors 3a and 3b are shown in the distance measurement sensor 3, the distance measurement sensor 3 is provided with a plurality of pairs of line sensors so that distance measurement can be performed for a plurality of lines as described later.

Figure 8:
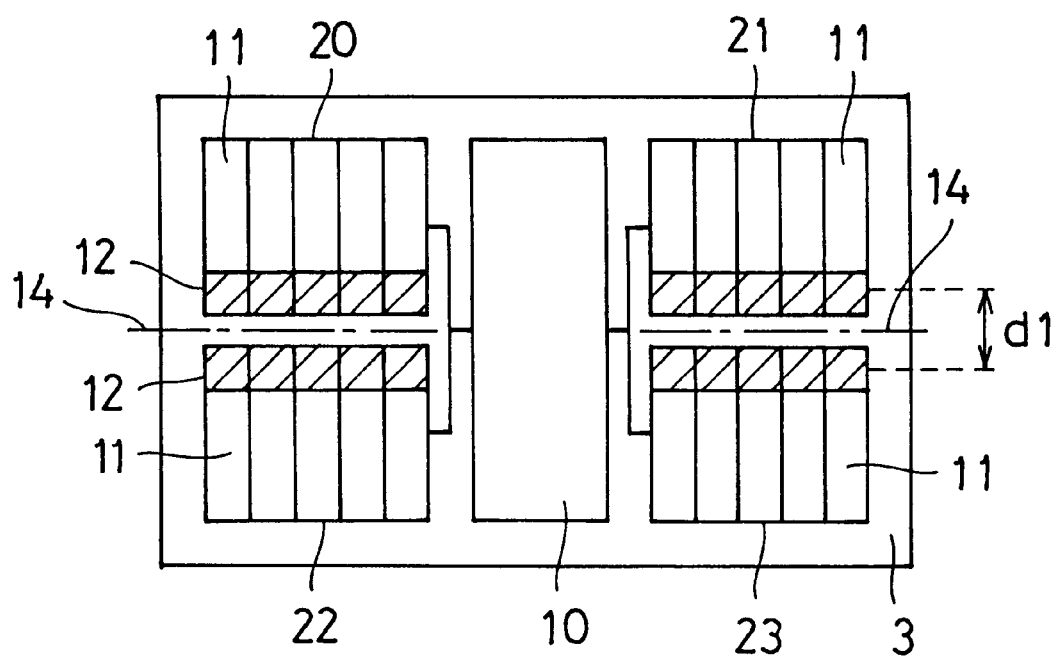
FIG. 8 is a front view of a distance measurement sensor of a distance detector of the imaging apparatus.

In the first embodiment, the distance measurement sensor 3 is configured to have two lines of distance measurement areas as shown in FIG. 8. A control circuit 10 is provided at the central position of the distance measurement sensor 3 that divides the sensor 3 into the left and the right parts. The control circuit 10 generates various clocks for signal transfer and supplies the clocks to two pairs of line sensors 20 to 23. The line sensors 20 to 23 each has a light sensing array 12 comprising a plurality of light sensing elements, and processors 11 for outputting photocharges generated in the light sensing arrays 12. The light sensing elements are, for example, photodiodes. In each of the light sensing arrays 12, a plurality of light sensing elements are provided in correspondence with the pixels.

Figure 9:
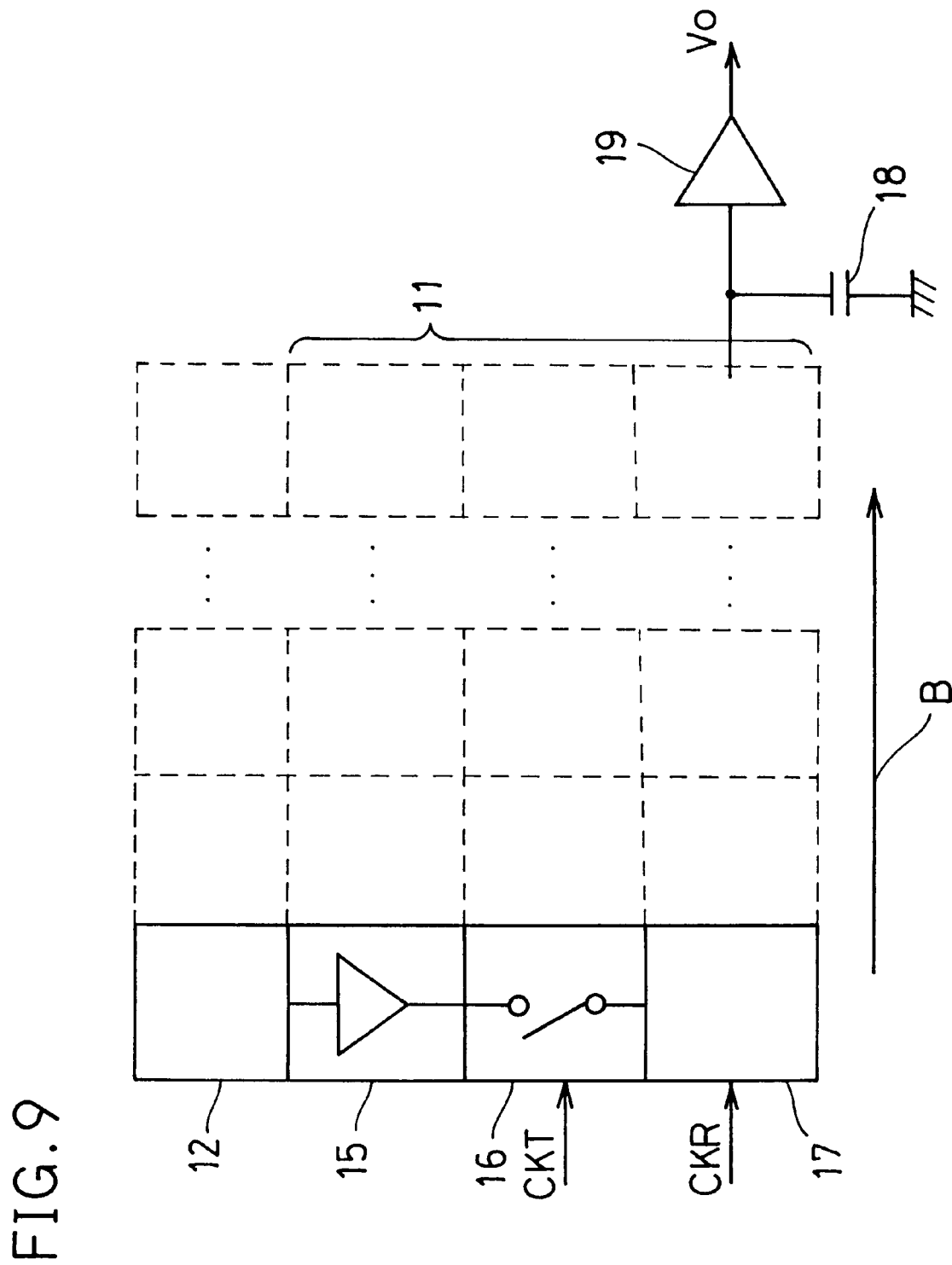
FIG. 9 is a detailed view of light sensing arrays and processors of the distance measurement sensor.

The relationship between the processors 11 and the light sensing array 12 is shown in FIG. 9. The processors 11 each have an amplifier 15, a switch 16 and a shift register 17. In the light sensing array 12, the photocharges generated by sensing light are stored for each pixel. By a clock CKT being transmitted from the control circuit 10 (see FIG. 8), the switch 16 is turned on and off, so that the photocharges are transmitted from the light sensing array 12 by way of the amplifier 15 and the switch 16 to the shift register 17.

The shift register 17 is supplied with a transfer clock CKR from the control circuit 10 (see FIG. 8) and the signals of the photocharges are successively transferred in the direction of the arrow B for each pixel. The clock CKR is mainly a two- or three-phase clock. The signals are converted into a signal voltage Vo by a stray diffusion capacitor 18 and an amplifier 19 disposed on the output side, and is output from the distance measurement sensor 3 (see FIG. 8).

Referring again to FIG. 8, distance measurement of one line is performed by one pair of line sensors 20 and 21. The other pair of line sensors 22 and 23 are disposed in a vertically symmetrical relationship with the line sensors 20 and 21 with a virtual line 14 shown by the dash and dotted line in between. The line sensors 20 to 23 are disposed on both sides with the virtual line 14 in between so as to be parallel to the virtual line 14 and so that the light sensing arrays 12 are closer to the virtual line 14 than the processors 11 accompanying the arrays 12.

Figure 1:
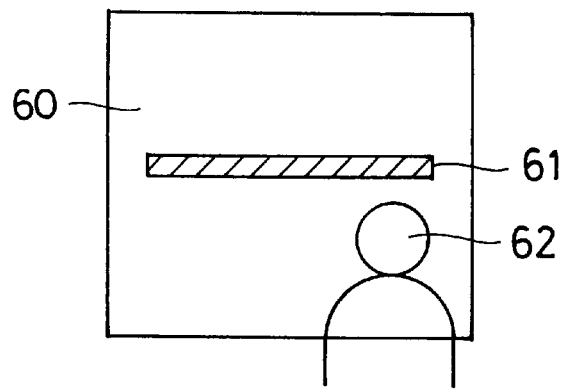
FIG. 1 shows the distance measurement area for the taking image plane of the conventional distance detector.
Figure 2:
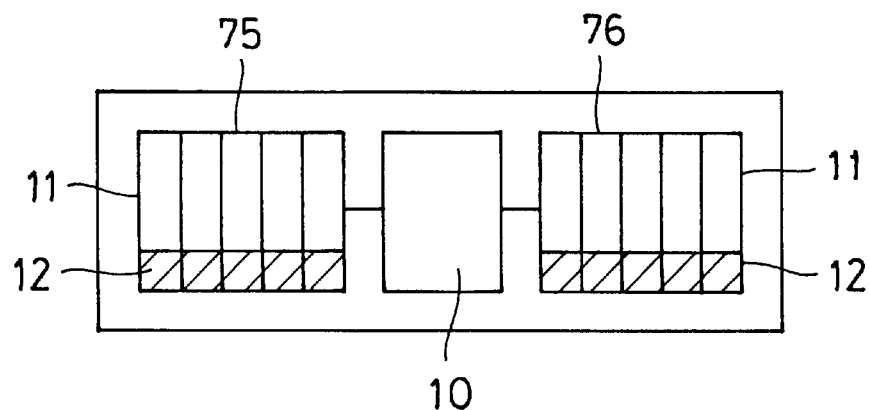
FIG. 2 is a front view of an example of the distance measurement sensor of the distance detector.
Figure 3:
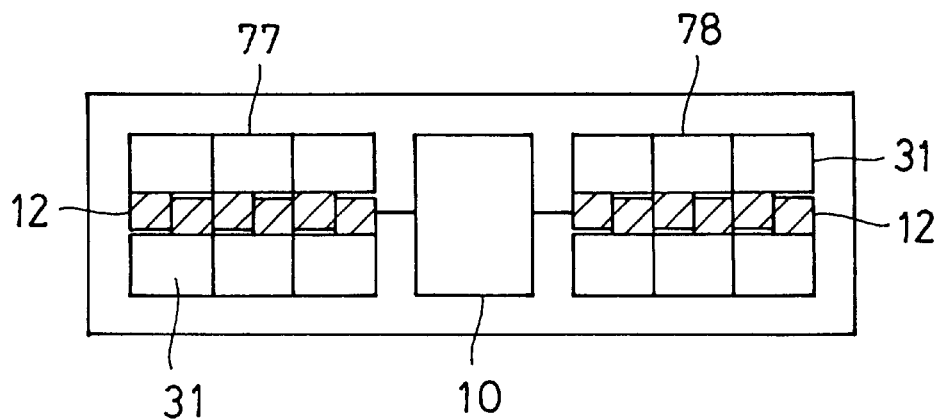
FIG. 3 is a front view of another example of the distance measurement sensor.
Figure 4:
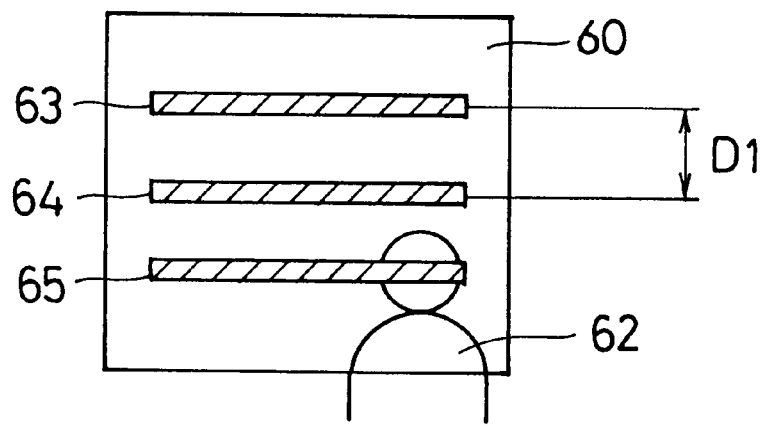
FIG. 4 shows the general outline of the distance detector having a plurality of lines of distance measurement areas.
Figure 5:
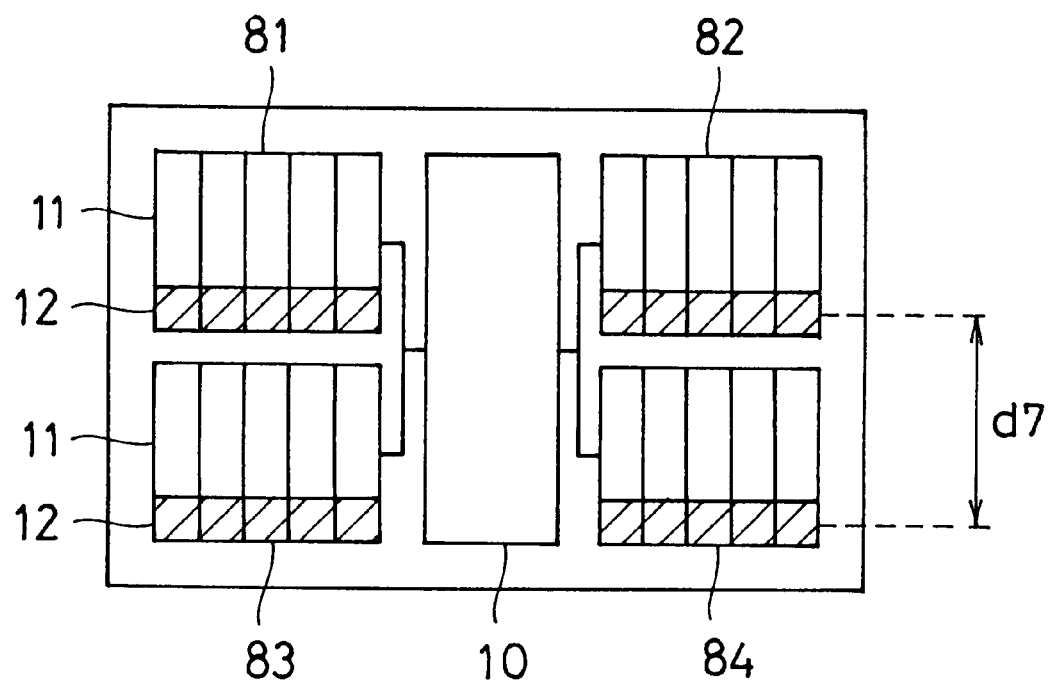
FIG. 5 is a front view of the conventional distance measurement sensor having a plurality lines of distance measurement areas.

Consequently, the distance d1 between the light sensing arrays 12 of the upper line sensors 20 and 21 and the light sensing arrays 12 of the lower line sensors 22 and 23 is shorter than the distance d7 in the distance measurement sensor (FIG. 5) in the previously-described conventional distance detector because the processors 11 are not interposed therebetween. Thus, in this embodiment, since the distance d1 can be sufficiently reduced, the line density of the distance measurement areas can be maintained high, so that the distance measurement areas can be prevented from being outside the image plane even if the focal length of the taking system increases to narrow the taking angle of view.

In FIG. 7, the microcomputer 4 obtains the distance to the subject based on signals from the distance measurement sensor 3 through a calculation which is an application of the principle of the trigonometric metering. This calculation will be briefly described.

First, the microcomputer 4 selects a line where the subject image is present from signals of a plurality of lines. Then, the microcomputer 4 obtains the distance between the subject images on the pair of left and right line sensors of the distance measurement sensor 3. In each module of the distance detector, the relationship between the distance to the subject and the distance between the subject images is measured in advance and the result of the measurement is stored in the microcomputer 4. In the distance measurement, the microcomputer 4 obtains the distance to the subject based on the stored measurement result.

For example, in a case where the stored measurement result is such that the distance between the subject images is x when the distance to the subject is 1 m (one meter) and the distance between the subject images is y when the distance to the subject is 2 m (two meters), the microcomputer 4 determines that the distance to the subject is approximately 1.5 m when the distance between the subject images takes an intermediate value between x and y based on signals from the distance measurement sensor 3. When the subject image is obtained from a plurality of lines, the detection accuracy can be improved by calculating the distance to the subject for each line and taking statistics of the calculation results.

<Second Embodiment>

Subsequently, a second embodiment of the present invention will be described. This embodiment has a block configuration (FIG. 7) similar to that of the above-described first embodiment. In order that there are three lines of distance measurement areas, three pairs of line sensors are arranged on the distance measurement sensor 3 in a manner as shown in FIG. 10.

Figure 10:
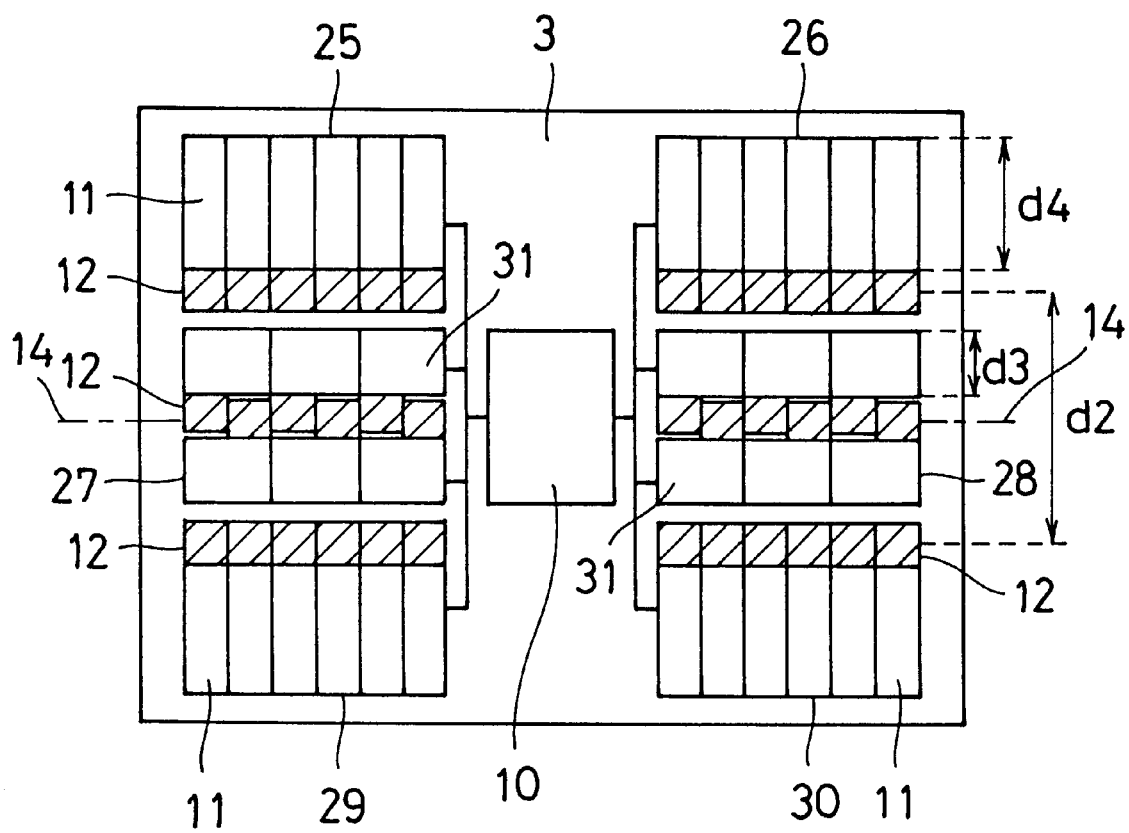
FIG. 10 is a front view of a distance measurement sensor of a distance detector according to a second embodiment of the present invention.
Figure 11:
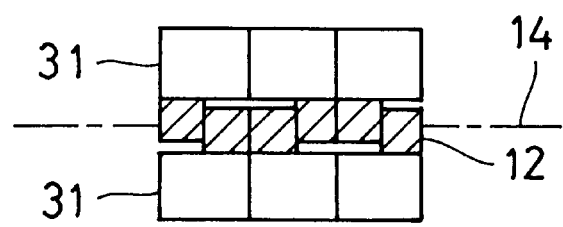
FIG. 11 is a partially enlarged view showing another example of a line sensor disposed on a virtual line in the second embodiment.

As shown in FIG. 10, the control circuit 10 is disposed at the central position of the distance measurement sensor 3 that divides the sensor 3 into the left and right parts, and supplies line sensors 25 to 30 with various clocks for signal transfer. A pair of line sensors 27 and 28 are disposed on the virtual line 14. The light sensing arrays 12 of the line sensors 27 and 28 are all situated on the virtual line 14. Processors 31 of the line sensors 27 and 28 are disposed on the opposite sides of the virtual line 14 in a vertically symmetrical relationship.

In the line sensors 27 and 28, the light sensing arrays 12 and the processors 31 are arranged so that a light sensing and a processor form an L-shaped pattern for each pixel and that the patterns engage with the patterns of adjoining pixels. In FIG. 10, the processors 31 are disposed so as to sandwich the virtual line 14 for each pixel. Consequently, the processor 31 can occupy the width corresponding to two pixels, so that the length of the processors 31 can be smaller than the length d4 of the processors 11. The line sensors 25, 26, 29 and 30 are arranged so that the light sensing arrays 12 are closer to the virtual line 14 than the processors 11 accompanying the arrays 12.

Consequently, in the line sensors 25 to 30, the distance d2 from the uppermost light sensing arrays 12 to the lowermost light sensing arrays 12 is shorter than in a conventional configuration where three pairs of line sensors are arranged so that the light sensing arrays and the processors are oriented in the same direction. The line sensors 27 and 28 situated on the virtual line 14 equally divide the distance between the three lines of distance measurement areas because the processors 31 are disposed on the opposite sides of the virtual line 14.

The arrangement pattern of the line sensors 27 and 28 situated on the virtual line 14 may be changed. For example, the processors may be arranged so as to face with the virtual line 14 in between every two pixels except the pixel at each end.

As described above, according to this embodiment, even in a distance detector in which three lines of distance measurement areas are provided in order to ensure detection of the subject and to improve the distance measurement accuracy, the distance between the line sensors can be reduced like in the above-described first embodiment, and even if the taking angle of view is narrowed, the distance measurement area is prevented from being outside the image plane.

<Third Embodiment>

Subsequently, a third embodiment of the present invention will be described. This embodiment has a block configuration (FIG. 7) similar to that of the above-described first embodiment. In order that there are four lines of distance measurement areas, four pairs of line sensors are arranged on the distance measurement sensor 3 in a manner as shown in FIG. 12.

Figure 12:
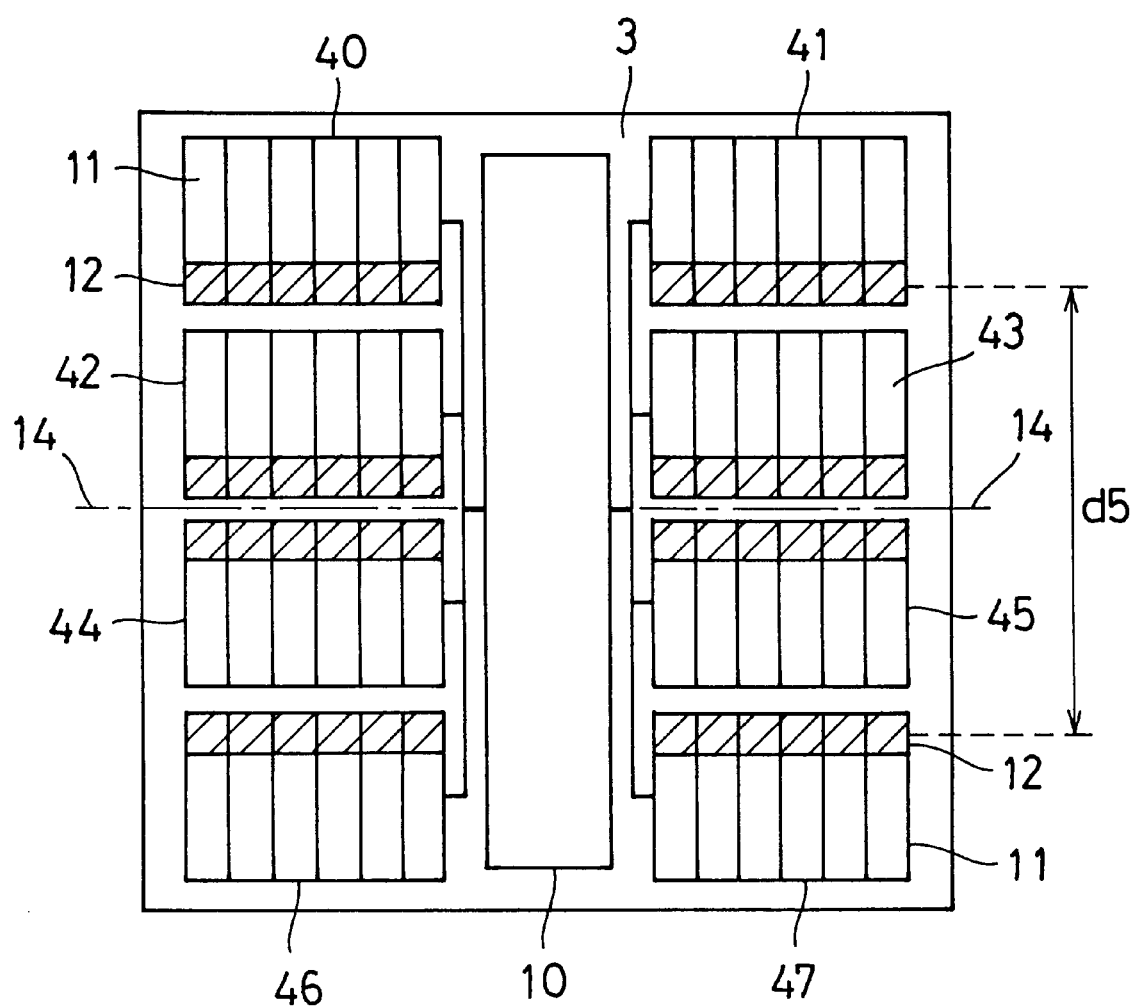
FIG. 12 is a front view of a distance measurement sensor of a distance detector according to a third embodiment of the present invention.

As shown in FIG. 12, four pairs of line sensors 40 to 47 are provided in the distance measurement sensor 3. The line sensors 42 to 45 facing with the virtual line 14 in between are arranged in a similar manner to the line sensors 20 to 23 of the distance measurement sensor 3 (FIG. 8) of the first embodiment.

In this embodiment, the line sensors 40, 41, 46 and 47 are arranged parallel to the virtual line 14 so as to sandwich the line sensors 42 to 45 and so that the light sensing arrays 12 are closer to the virtual line 14 than the accompanying processors 11.

Thus, since the light sensing arrays 12 are disposed on the side closer to the virtual line 14 with the virtual line 14 in between in the line sensors 40 to 47, the distance d5 from the uppermost light sensing array to the lower most light sensing array is shorter than in a conventional configuration in which four pairs of line sensors are arranged so that the light sensing arrays and the processors are oriented in the same direction.

For this reason, in this embodiment, although as many as four lines of distance measurement areas are provided in order to ensure detection of the subject and to improve the detection accuracy, since the distance d5 is short in the distance measurement sensor 3 as a whole, the distance which the line sensors 40 to 47 face is short, so that even if the taking angle of view is narrowed, the distance measurement area is prevented from being outside the taking image plane.

In FIG. 12, for example, even when the line sensors 40 and 41 are omitted and the line sensor pairs are not symmetrically arranged, the remaining line sensors 42 to 47 can be arranged at a high density.

<Fourth Embodiment>

Subsequently, a fourth embodiment of the present invention will be described. This embodiment has a block configuration (FIG. 7) similar to that of the above-described first embodiment. In order that there are five lines of distance measurement areas, five pairs of line sensors are arranged on the distance measurement sensor 3 in a manner as shown in FIG. 13.

Figure 13:
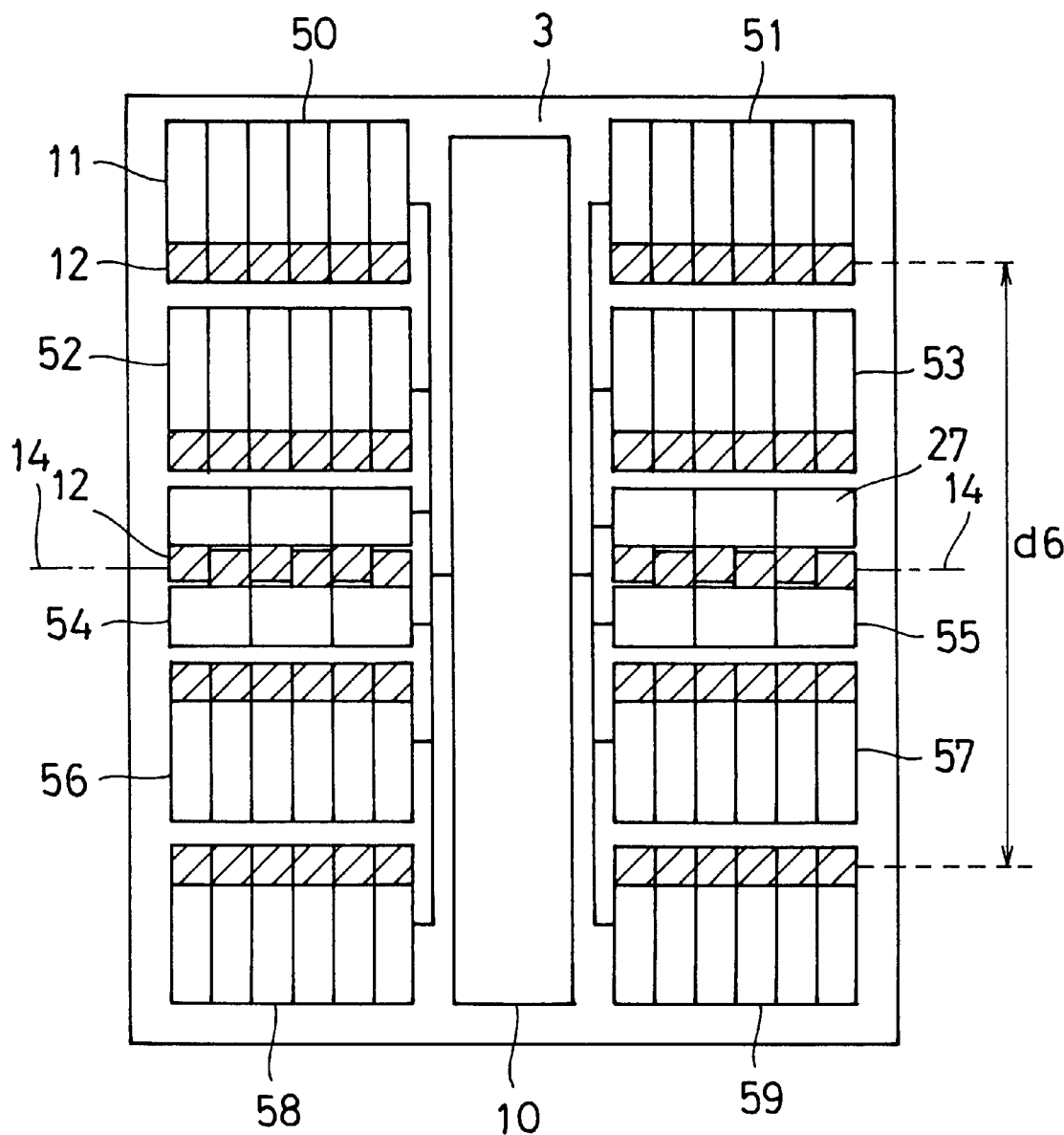
FIG. 13 is a front view of a distance measurement sensor of a distance detector according to a fourth embodiment of the present invention.

As shown in FIG. 13, five pairs of line sensors 50 to 59 are provided in the distance measurement sensor 3. The line sensors 52 to 57 disposed with the virtual line 14 in between are arranged in a similar manner to the line sensors 25 to 30 of the distance measurement sensor 3 (FIG. 10) of the second embodiment.

In this embodiment, the line sensors 50, 51, 58 and 59 are arranged parallel to the virtual line 14 so as to sandwich the line sensors 52 to 57 and so that the light sensing arrays 12 are closer to the virtual line 14 than the accompanying processors 11.

Thus, since the light sensing arrays 12 are disposed on the side closer to the virtual line 14 with the virtual line 14 in between in the line sensors 50 to 59, the distance d6 from the uppermost light sensing array to the lower most light sensing array is shorter than in a conventional configuration in which five pairs of line sensors are arranged so that the light sensing arrays and the processors are oriented in the same direction.

For this reason, in this embodiment, although as many as five lines of distance measurement areas are provided in order to ensure detection of the subject and to improve the detection accuracy, since the distance d6 is short in the distance measurement sensor 3 as a whole, the distance measurement area is prevented from being outside the taking image plane even if the taking angle of view is narrowed.

Although not described in detail, when the number of lines of distance measurement areas increases like 6, 7, . . . , the line sensors can be arranged so as to be parallel to the virtual line 14 and so that the light sensing arrays are closer to the virtual line than the processors. This increases the distance measurement line density.

In FIG. 13, even when the line sensors 54 and 55 of the L-shaped pattern are not situated on the axis of symmetry like when the line sensors 50 and 51 are omitted, the line sensors 52 to 59 can be arranged at a high density.

Obviously, many modifications and variations of the present invention are possible in light of the above teachings. It is therefore to be understood that within the scope of the appended claims, the invention may be practiced other than as specifically described.

What is claimed is:

1. A distance detector comprising:

an optical system for forming a subject image;

a distance measurement sensor having at least two pairs of sensors, corresponding pairs arranged on opposite sides of a virtual line, each sensor including a plurality of line sensors disposed substantially on an imaging plane of said optical system, said plurality of line sensors each having a light sensing array comprising a plurality of pixels for sensing the subject image and a processor array for processing outputs of the light sensing array, said corresponding pairs of sensors being arranged so as to be a mirror image with respect to the virtual line and so that the light sensing arrays are closer to said virtual line than the processor arrays; and a distance calculating circuit for calculating a distance to the subject based on an output from each corresponding pair of sensors, respectively.

2. A distance detector as claimed in claim 1, further comprising at least a third pair of sensors, the third pair of sensors being disposed so that the light sensing array is situated on said virtual line.

3. A distance detector as claimed in claim 2, wherein the processors of said third pair of sensors are disposed on both sides of the light sensing array, and a length of the processors is smaller than that of the processors of other pairs of sensors.

4. A distance detector as claimed in claim 1, wherein said processor arrays each comprise an amplifier for amplifying a signal from each pixel of the light sensing arrays, and a shift register for transferring a signal output from the amplifier.

5. A photoelectric converter comprising:

at least three pairs of sensors, corresponding pairs of sensors arranged on opposite sides of a virtual line, each sensor including a plurality of line sensors each having a light sensing array comprising a plurality of pixels for sensing a subject image and a processor array for processing outputs of the light sensing array, and pixels of different pairs of sensors arranged at different intervals from the virtual line, said corresponding pairs of sensors being arranged so as to be a mirror image with respect to the virtual line and so that the light sensing arrays are closer to said virtual line than the processor arrays; and a control circuit for controlling said plurality of line sensors.

6. A photoelectric converter as claimed in claim 5, said third pair of sensors being disposed so that the light sensing array is situated on said virtual line.

7. A photoelectric converter as claimed in claim 6, wherein the processors of said third pair of sensors are disposed on both sides of the light sensing array, and a length of the processors is smaller than that of the processors of other pairs of sensors.

8. A photoelectric converter as claimed in claim 5, wherein said processor arrays each comprise an amplifier for amplifying a signal from each pixel of the light sensing arrays, and a shift register for transferring a signal output from the amplifier.

9. A photoelectric converter as claimed in claim 5, wherein said photoelectric converter is used for distance detection.

10. A photoelectric converter as claimed in claim 5, wherein the interval between the pixels of different pairs of sensors becomes shorter closer to the virtual line.

11. An automatic focusing device comprising:

at least two pairs of sensors, corresponding pairs arranged on opposite sides of a virtual line, each sensor including a plurality of line sensors each having a light sensing array comprising a plurality of pixels for sensing a subject image and a processor array for processing outputs of the light sensing array, said corresponding pairs of sensors being arranged so as to be a mirror image with respect to the virtual line and so that the light sensing arrays are closer to said virtual line than the processor arrays; and an automatic focusing circuit for performing focusing of a taking lens based on outputs from each respective pair of sensors.

12. An automatic focusing device as claimed in claim 11, further comprising at least a third pair of sensors, the third pair of sensors being disposed so that the light sensing array is situated on said virtual line.

13. An automatic focusing device as claimed in claim 12, wherein the processors of said third pair of sensors are disposed on both sides of the light sensing array, and a length of the processors is smaller than that of the processors of other pairs of sensors.

14. An automatic focusing device as claimed in claim 11, wherein said processor arrays each comprise an amplifier for amplifying a signal from each pixel of the light sensing arrays, and a shift register for transferring a signal output from the amplifier.

* * * * *